(12) United States Patent
Ahmed et al.

(10) Patent No.: US 8,857,267 B2
(45) Date of Patent: Oct. 14, 2014

(54) MULTIPHASE FLOW DETECTOR

(75) Inventors: Wael H. Ahmed, Dhahran (SA); Abdel Salam Al Sarkhi, Dhahran (SA); Meamer El Nakla, Dhahran (SA)

(73) Assignees: King Fahd University of Pretroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 234 days.

(21) Appl. No.: 13/603,254

(22) Filed: Sep. 4, 2012

(65) Prior Publication Data

US 2014/0060204 A1  Mar. 6, 2014

(51) Int. Cl.
    *G01F 1/74*  (2006.01)
(52) U.S. Cl.
    USPC ........................................... 73/861.04
(58) Field of Classification Search
    USPC .............. 73/861.04, 861.08, 861.31, 861.42, 73/861, 861.65
    See application file for complete search history.

(56) References Cited

U.S. PATENT DOCUMENTS

| | | | | |
|---|---|---|---|---|
| 2,646,511 A | * | 7/1953 | Hulstede | 331/101 |
| 5,125,276 A | * | 6/1992 | Wada | 73/861.12 |
| 5,736,651 A | * | 4/1998 | Bowers | 73/861.66 |
| 5,770,805 A | * | 6/1998 | Castel | 73/861.04 |
| 5,861,556 A | * | 1/1999 | Nukui et al. | 73/204.17 |
| 7,013,715 B2 | | 3/2006 | Dutton et al. | |
| 7,363,800 B2 | * | 4/2008 | Gysling | 73/19.01 |
| 7,574,907 B2 | * | 8/2009 | Maute | 73/152.29 |
| 7,587,948 B2 | * | 9/2009 | Gysling et al. | 73/861.42 |
| 7,624,652 B2 | | 12/2009 | Wee et al. | |
| 7,832,367 B2 | * | 11/2010 | Valentas et al. | 122/506 |
| 2002/0050176 A1 | * | 5/2002 | Su | 73/861.31 |
| 2013/0305838 A1 | * | 11/2013 | Mikolichek et al. | 73/861.08 |

* cited by examiner

*Primary Examiner* — Jewel V Thompson
(74) *Attorney, Agent, or Firm* — Richard C. Litman

(57) ABSTRACT

The multiphase flow detector detects the different fractions of different phases of fluids, i.e., oil, water, and/or gas, flowing through a pipeline or the like. The detector includes a plurality of capacitive and resistive probes extending radially into an oil delivery pipeline. The probes preferably have various different lengths from one another to detect differences in fluid phases at differing distances from the pipe wall as the fluid flows randomly therethrough. The capacitive and resistive probes are preferably evenly spaced from one another in an alternating circumferential array. Two rings or stations of such probes are preferably installed in the pipe to measure the velocity of flow in the pipe, as well as the fluid fractions flowing therethrough. Appropriate algorithms enable a central controller to determine the fraction differences between oil and water and between oil and gas, and therefore to determine the fraction difference between water and gas.

14 Claims, 8 Drawing Sheets

MULTIPHASE FLOW DETECTOR

BACKGROUND OF THE INVENTION

1. Field of the Invention

The present invention relates generally to automated sensing systems, and particularly to a multiphase flow detector for installation in a pipeline carrying oil and/or other fluids therein.

2. Description of the Related Art

In the petroleum industry, pipes and other conduits often carry fluids of various types, both liquid and gas. For example, a pipeline may carry crude oil mixed with water and air or other gas from a wellhead to a refinery or transport site. These different fluids are termed "phases" in the petroleum industry. Oil and water are considered as two different phases, even though they are both liquids, and gas is a third phase of matter that may be carried through a pipeline.

Knowledge of the specific ratios or quantities of the various phases of fluids passing through the pipeline is useful for various reasons. The economic value of crude oil, as opposed to latent water that has issued from the wellhead, is obvious. In addition, there is generally at least some dissolved gas under pressure or in pockets in the subsurface oil deposit, and this gas becomes mixed with the crude oil as it issues from the wellhead and passes into and through the pipeline. While the gas may have some commercial value, its presence can distort measurements of the quantity of oil passing through the pipeline.

Thus, a multiphase flow detector solving the aforementioned problems is desired.

SUMMARY OF THE INVENTION

The multiphase flow detector uses the principles of capacitive and resistive measurement of fluids passing through a pipeline to determine the relative volumes of oil, water, and gas passing through the pipe. The detector comprises at least one ring of alternating capacitive and resistive probes extending radially into the pipe through passages in the wall of the pipe, or from a collar installed between two sections of pipe. The lengths of the probes preferably vary somewhat from one another in order to accurately sense different phases of the fluids as they flow randomly through the pipe at various depths from the pipe wall. Preferably two such rings are spaced apart along a length of the pipe to determine the velocity of the fluids flowing through the pipe.

The signature of water as detected by a capacitive probe is significantly different from the signatures of oil and gas, which are quite similar. However, the signatures of oil and gas are quite distinctive as measured using a resistance probe. Water has a relatively weak signature as measured using a resistance probe. By incorporating both capacitance and resistance probes, the ratios of the three phases of fluids (oil, water, and gas) may be determined by a central controller programmed with suitable algorithms that determine the fractions of the different phases of fluid flowing through the pipeline from capacitance and resistance measurements, and that may also determine the velocity of fluid flow by correlating a section of the flow as it passes first and second rings of probes separated by a known distance.

The use of electronic probes as opposed to mechanical sensing devices permits the system to be installed in any pipe orientation, i.e., vertical, inclined, or horizontal. Moreover, the condition of the fluids flowing through the pipe does not affect the accuracy of the fraction measurements of that fluid. The fluid may be flowing in stratified (laminar) flow, semi-stratified (wavy), annular (smooth flow with more rapid flow through the center of the pipe), slug (different phases in different sections of the pipe), or bubble (mixed gas) flow. The measurements provided by the combination of capacitive and resistive probes are immune to specific flow conditions.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The multiphase flow detector combines capacitive and resistive probes to provide accurate measurements of the fractions of oil, water, and gas flowing through a pipeline or similar structure. Capacitive measurements detect the difference between water and other fluids (oil or gas), and resistive measurements detect the difference between oil and gas fractions. Appropriate algorithms are used to combine the data received from the two types of probes, thereby providing an accurate measurement of the three phases (oil, water, and gas) flowing through the pipeline.

Figure 1:
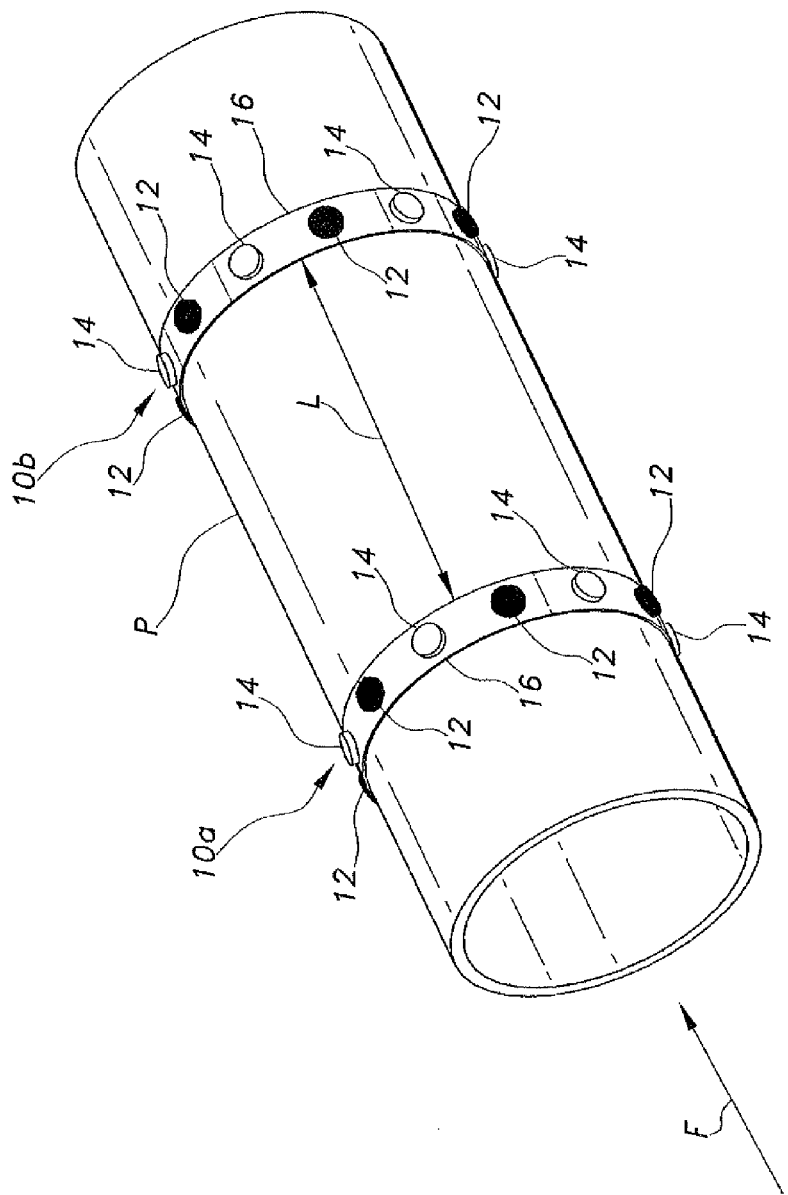
FIG. 1 is a diagrammatic environmental perspective view of a multiphase flow detector according to the present invention.

FIG. 1 of the drawings is a schematic illustration of an exemplary probe installation in a pipe or pipeline P. Fluid flow through the pipe P is in the direction indicated by the flow arrow F. A first circumferential array 10a of capacitive probes 12 and resistive probes 14 is installed in an upstream portion of the pipe P, and a second circumferential array 10b of such probes is installed downstream of the first array 10a and separated therefrom by a distance L representing a portion of the length of the pipe P. The probe arrays may be installed directly through the wall of the pipe P, or in a detector band or ring 16 that is installed at a joint or connection between sections of pipe. Alternatively, the multiphase flow detector may be a segment of pipe having a single ring of probes installed therein, or two rings of probes separated by a known length, the segment being adapted for insertion into an existing pipeline. The use of two arrays 10a and 10b of probes is not required to determine the fractions of the fluids flowing through the pipe P, but is necessary to determine the velocity of the fluid flow within the pipe P.

Figure 2B:
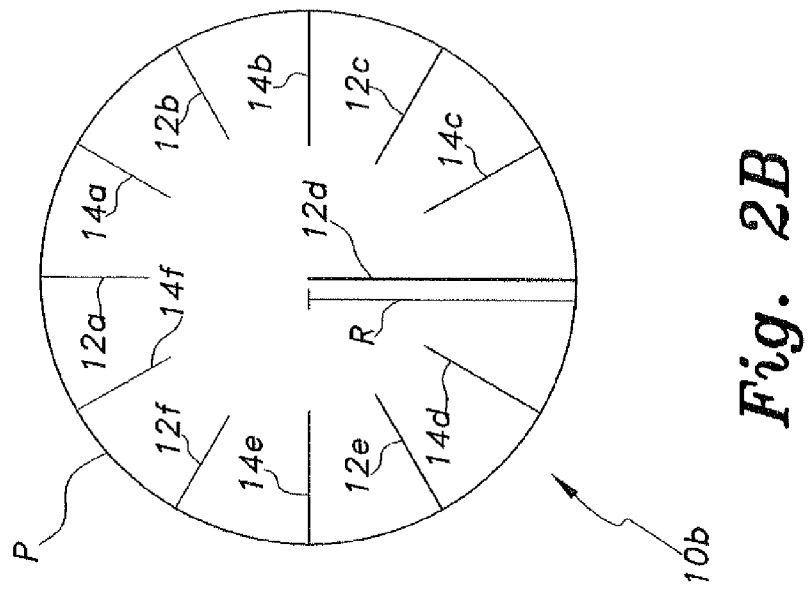
FIG. 2B is a diagrammatic view in section through the pipeline of FIG. 1, illustrating the installation of the second detector array within the pipe and the relative lengths of the detector probes.

Each array of probes comprises a plurality of capacitive probes 12 and resistive probes 14. The two types of probes are preferably arranged in an alternating circumferential array about the pipe P or band 16, generally as shown in FIGS. 1 through 2B of the drawings. While the capacitive probes 12 are shaded black in FIG. 1 and the resistive probes 14 are shaded white, it will be understood that this shading is merely to distinguish the two probe types from one another visually in the drawing.

Figure 2A:
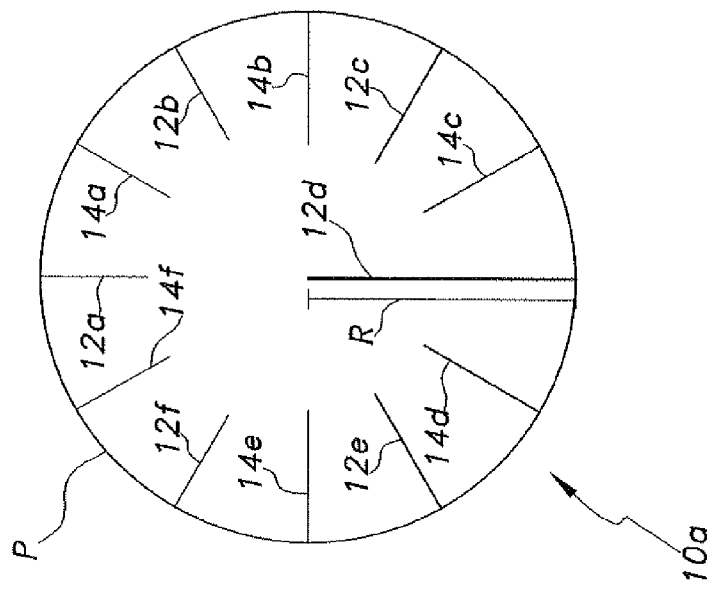
FIG. 2A is a diagrammatic view in section through the pipeline of FIG. 1, illustrating the installation of the first detector array within the pipe and the relative lengths of the detector probes.

FIGS. 2A and 2B provide further diagrammatic illustrations of exemplary probe arrays. It will be seen that the two arrays illustrated in FIGS. 2A and 2B are identical to one another, as they represent two identical installations comprising an upstream installation or array 10a in FIG. 2A and a downstream installation or array 10b in FIG. 2B. Each array 10a and 10b includes six capacitive probes, indicated as probes 12a through 12f, and six resistive probes, indicated as probes 14a through 14f. The probes are arranged with capacitive and resistive probes alternating, such that each capacitive probe is located between two resistive probes and each resistive probe is located between two capacitive probes. The total of twelve capacitive and resistive probes are preferably evenly spaced about the circumference of the pipe P, adjacent probes being spaced apart by 30°, as in the spacing between hour marks on a conventional analog clock or watch.

It will be noted in FIGS. 2A and 2B that the various probes have different lengths. This is to ensure that the operative portions of the probes will be at different depths in the pipe P relative to the radius of the pipe, i.e., the distance between the pipe wall and the center of the pipe. In the examples of FIGS. 2A and 2B, the first and second capacitive probes 12a and 12b are relatively short, having lengths of only 0.4 of the internal radius R of the pipe P. The third and fifth capacitive probes 12c and 12e, at the four o'clock and eight o'clock positions, respectively, as shown in FIGS. 2A and 2B, have lengths of one-half the internal radius R of the pipe P. The fourth capacitive probe 12d extends inward from the six o'clock position and has a length equal to the internal radius R of the pipe P. The sixth capacitive probe 12f has a length equal to that of the first two capacitive probes 12a and 12b, i.e., 0.4 of the internal radius R of the pipe P.

The various resistive probes 14a through 14f have different lengths as well. It will be seen in FIGS. 2A and 2B that the first and sixth resistive probes 14a and 14f have lengths equal to the lengths of the capacitive probes 12a, 12b, and 12f, i.e., 0.4 the internal radius R of the pipe P. The second, third, fourth, and fifth resistive probes 14b, 14c, 14d, and 14e all have lengths equal to the lengths of the third and fifth capacitive probes 12c and 12e, i.e., one-half the internal radius R of the pipe P. It will be understood that these lengths are exemplary, and that they may be adjusted as desired. However, research has shown that the above-described probe lengths work well.

Figure 3:
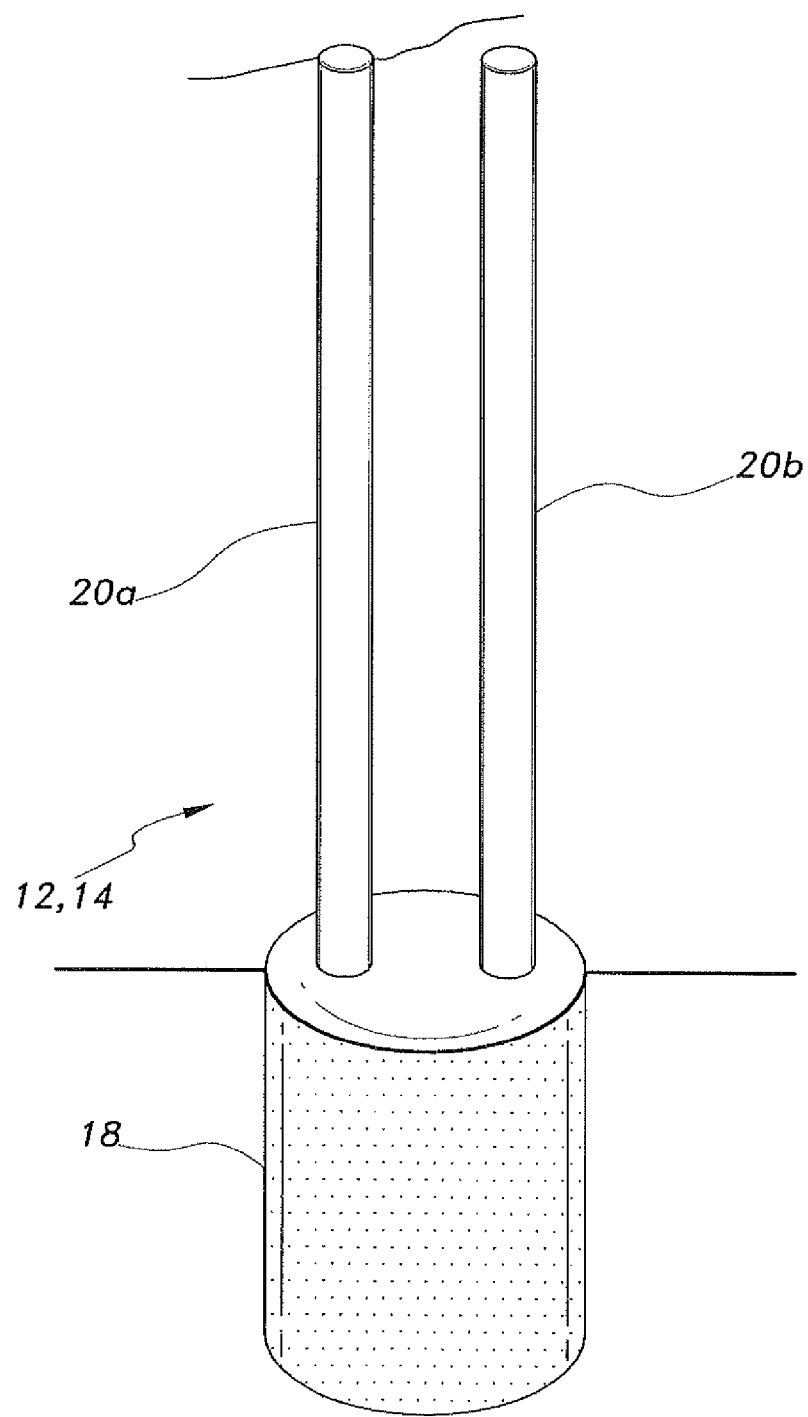
FIG. 3 is a perspective view of an exemplary detector probe of a multiphase flow detector according to the present invention.

FIG. 3 of the drawings provides a perspective view of an exemplary capacitive or resistive probe 12 or 14. The two types of probes have identical appearances, and thus a single drawing Fig. will suffice to illustrate both probes. Each of the probes 12 and 14 has a base 18 that is installed through the wall of the pipe P, or into a band or ring 16 for installation in a joint of the pipe P. Mutually parallel first and second probe elements comprising rods 20a and 20b extend from the base 18. The two rods 20a, 20b are preferably spaced apart from one another a span or distance equal to about twice their diameters. The base 18 includes conventional electronics for determining the capacitance or resistance detected by the two rods 20a and 20b, and for transmitting the detected capacitance or resistance to a processor for determining the oil, water, and gas fractions flowing through the pipe. The signals from the probes 12 and 14 may be transmitted by wire or wireless means, both of which means are conventional.

Figure 4:
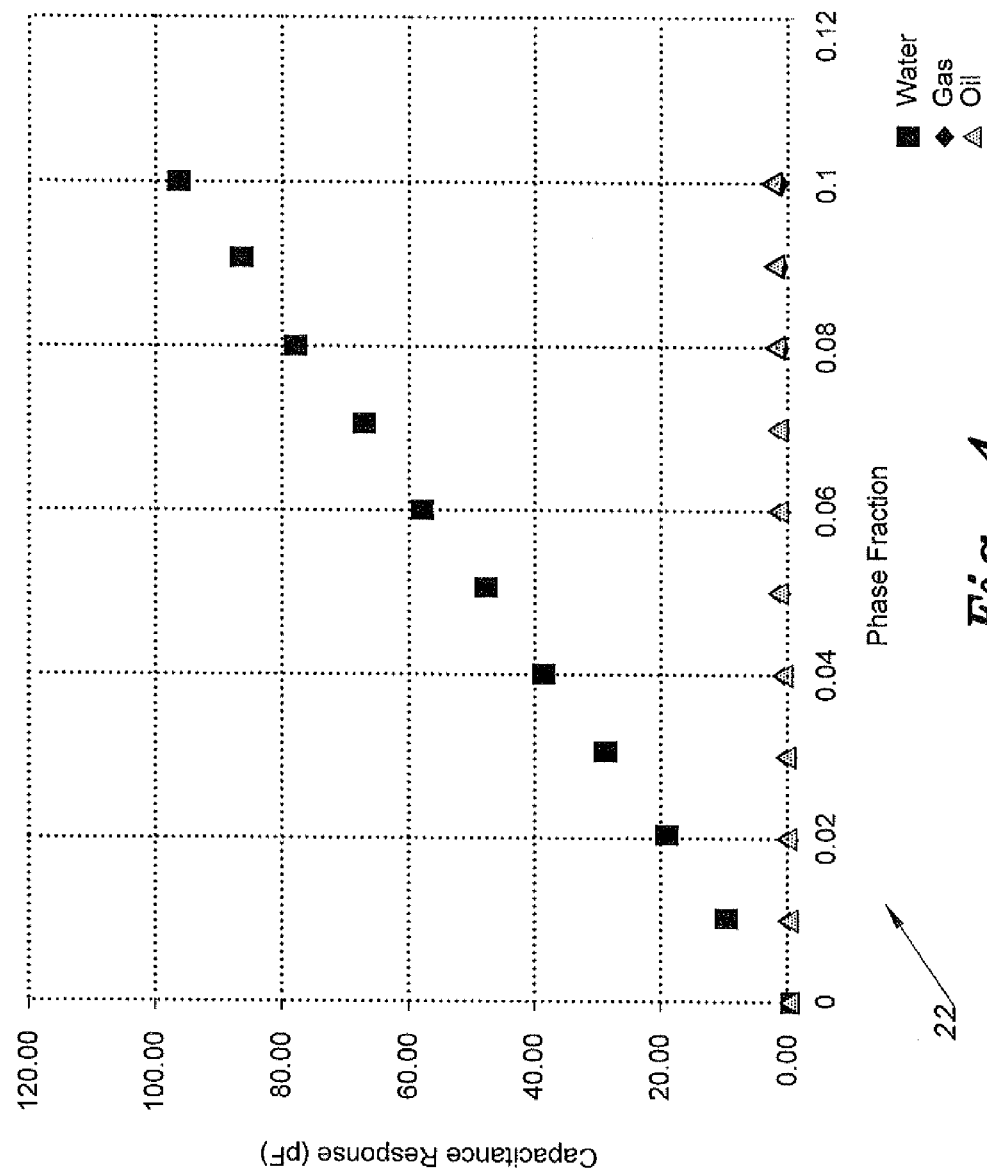
FIG. 4 is a graph illustrating the response of a capacitive detector probe of a multiphase flow detector according to the present invention to different fractions of fluids in the pipeline.

FIG. 4 is a graph 22 illustrating the response of an exemplary capacitance probe 12 in detecting the phase fractions of oil, water, and gas in the pipe. It will be seen that the response to the capacitance probe to the presence of water is substantially linear, having an initial point at the lower left corner of the graph representing a complete lack of water (or other fluids) in the pipe, the capacitance being nil at 0 picofarads but increasing to about one hundred picofarads at a fraction of about ten percent water. (The actual capacitance will depend upon a number of factors including the diameters of the probe rods and their spacing, and the lengths of the probe rods relative to the diameter or radius of the pipe.) It will also be noted that the oil and gas fractions do not affect the capacitance to any significant degree as the fractions increase from zero to about ten percent, the capacitance of the oil and gas fractions remaining quite close to zero picofarads. Thus, the capacitance probes 12 can readily detect the presence of water in a multiphase mixture of water, oil, and gas, although they cannot readily determine the relative fractions of oil and gas.

Figure 5:
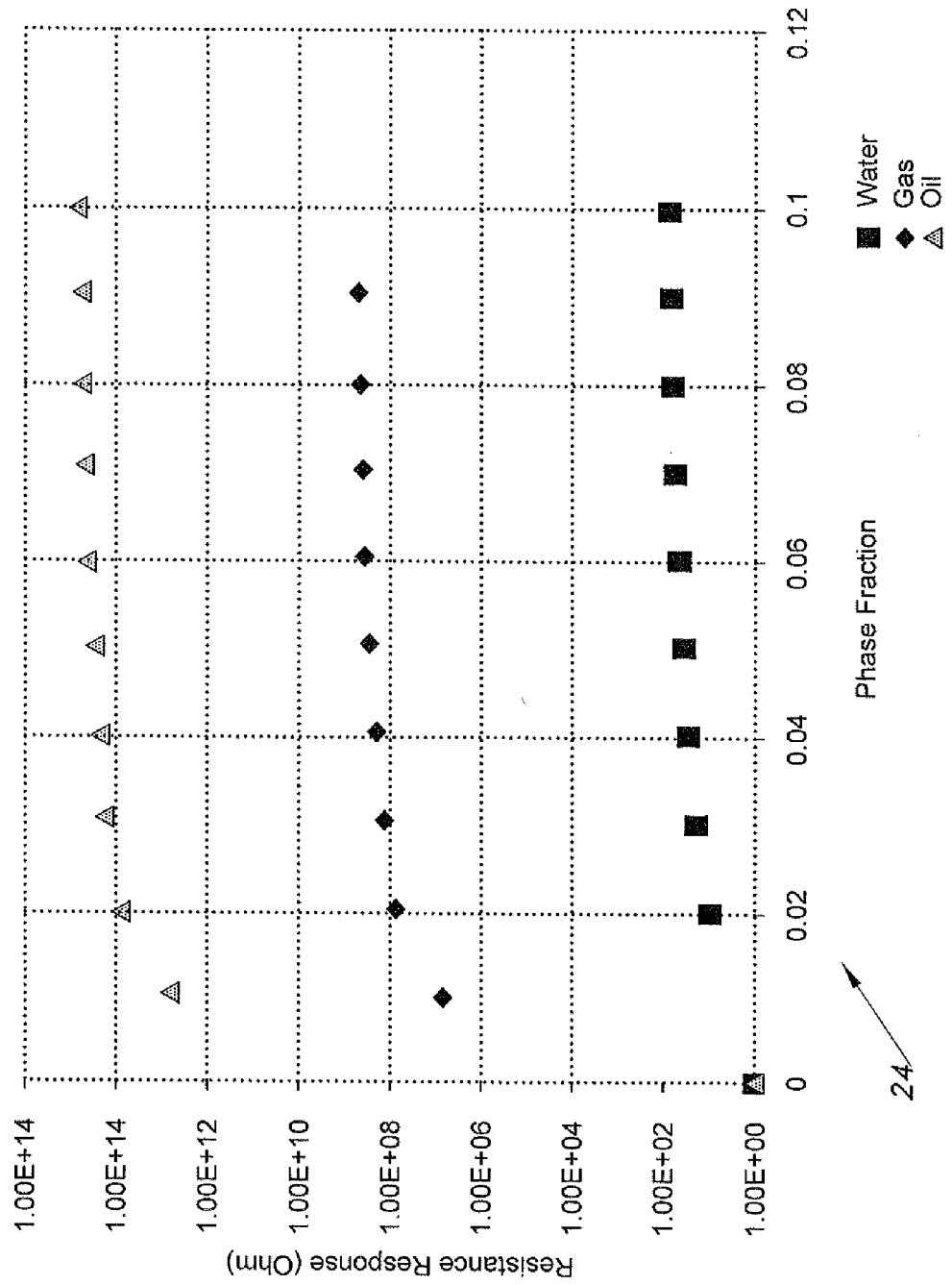
FIG. 5 is a graph illustrating the response of a resistive detector probe of a multiphase flow detector according to the present invention to different fractions of fluids in the pipeline.

FIG. 5 is a graph 24 showing the response of an exemplary resistance probe 14 to various fractions of oil, water, and gas in the pipeline. It will be seen that as the fraction of any of the oil, water, and/or gas fluids increases initially from zero to some larger fraction, so does the resistance. This is most notable with relatively small fractions of gas and oil, their resistances being considerably higher than that of oil. The resistance of gas and oil tends to stabilize beyond fractions of about two percent, but the gas and oil signatures are quite specific at relatively small fractions.

Figure 6:
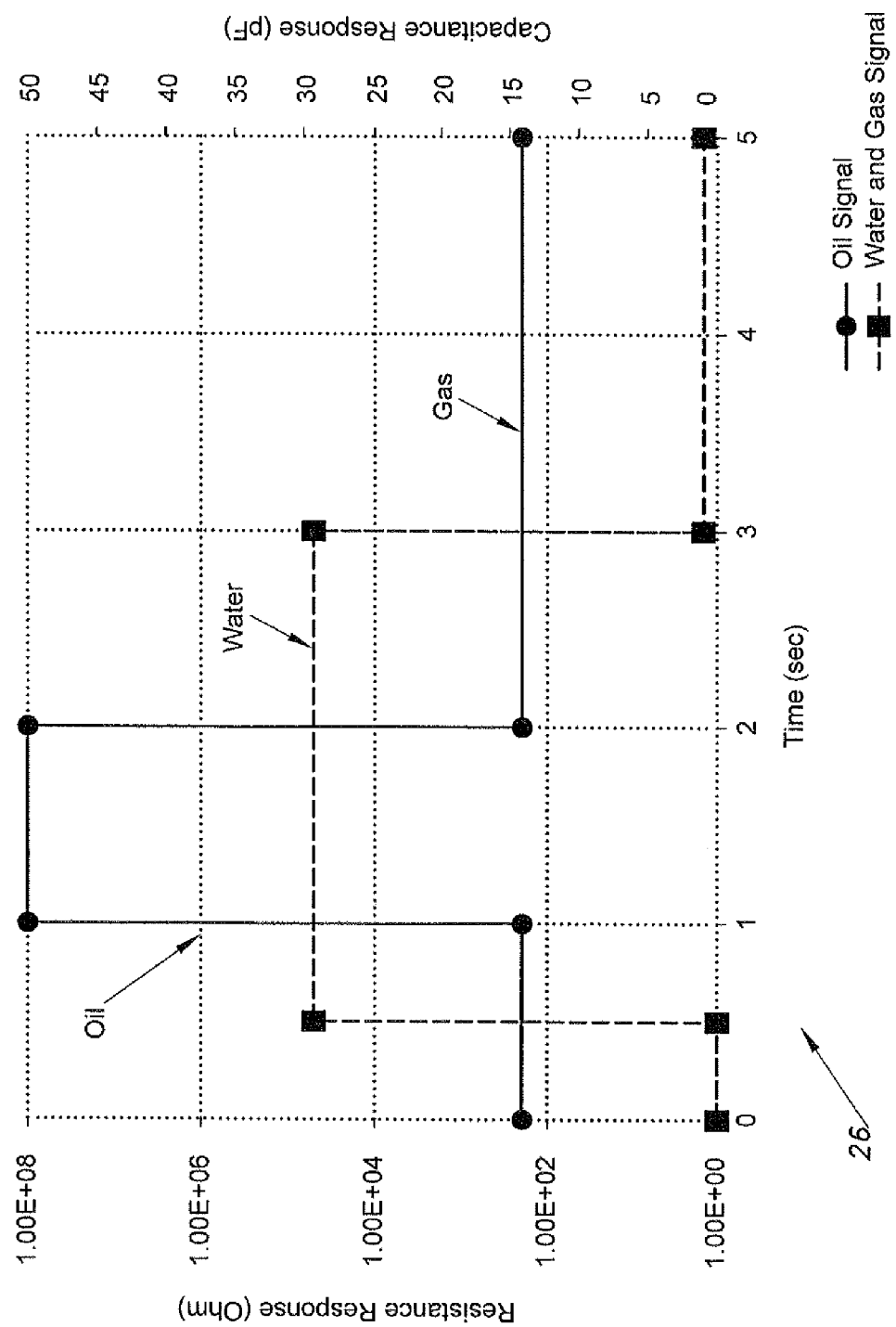
FIG. 6 is a graph illustrating the difference in response of the capacitive and resistive probes of the multiphase flow detector according to the present invention.

The relative values of capacitance and resistance detected by the corresponding probes may be plotted on a single graph, an example of which is provided by the graph 26 of FIG. 6. The combined graph 26 of FIG. 6 plots the relative resistance and capacitance, and therefore the fractions, of oil, water, and gas flowing through a pipeline or the like over a period of time. It will be seen that the oil and gas phases are identified by the resistance probe (scale in Ohms to the left), and the water phase is shown by the capacitance probe (scale in picofarads to the right).

The signals generated by the probes in the upstream and/or downstream arrays 10a and 10b are transmitted by either wired or wireless transmission to a central controller for data analysis. The central controller may be a computer, a programmable logic controller, a digital signal processor circuit, a microcontroller circuit, or the like having a display to show the results of numerical calculations or a graphical user interface to display characteristics of the multiphase flow graphically, memory to store the data and the results of data analysis, and a printer or a port for connection to a printer to print the results of data analysis. The central controller is programmed using BASIC, FORTRAN, C, C++, Java, or any suitable programming language to carry out the calculations described below.

A series of equations has been developed to transform the output of the capacitive and resistive probes 12 and 14 to the appropriate fractional values of oil, water, and gas detected by the probes. Equation (1) is used to determine the fractional value of gas (or air) in the multiphase flow in the pipeline:

$$C_{air} = \frac{\pi L_{air} \cdot k\varepsilon_o}{\ln\left[\left(\frac{x}{2d}\right) + \sqrt{\left(\frac{x}{2d}\right)^2 - 1}\right]}, \quad (1)$$

where $C_{air}$ is the capacitance value of air (or other gas), $L_{air}$ is the length of the probe as a percentage of the diameter of the pipe, k is a constant, x is the spacing between the probe rods or elements, and d is the diameters of the probe rods. While C represents the capacitance in general, it will be seen that equation (1) and the following equations (2) and (3) are applied to each of the capacitive probes and added to arrive at a total capacitance.

Equations (2) and (3) are similar to equation (1), but provide solutions for fractional values of water and oil, respectively:

$$C_{water} = \frac{\pi L_{water} \cdot k\varepsilon_o}{\ln\left[\left(\frac{x}{2d}\right) + \sqrt{\left(\frac{x}{2d}\right)^2 - 1}\right]} \quad (2)$$

$$C_{oil} = \frac{\pi L_{oil} \cdot k\varepsilon_o}{\ln\left[\left(\frac{x}{2d}\right) + \sqrt{\left(\frac{x}{2d}\right)^2 - 1}\right]}, \quad (3)$$

where $C_{water}$ and $C_{oil}$ are the respective capacitance values of water and oil and $L_{water}$ and $L_{oil}$ are the respective lengths of the probe in water and in oil, respectively. Other variables are identical to those described further above for equation (1).

The results obtained from the above three equations may be combined to arrive at a total capacitance using the following equation (4):

$$C_{total} = C_{water} + C_{air} + C_{oil}. \quad (4)$$

The results for the resistive probes are calculated in a somewhat similar manner, by means of the following equations:

$$R_{air} = \frac{L_{air} R_0}{\pi} \cosh^{-1}\left(\frac{x}{d}\right) \quad (5)$$

$$R_{water} = \frac{L_{water} R_0}{\pi} \cosh^{-1}\left(\frac{x}{d}\right) \quad (6)$$

$$R_{oil} = \frac{L_{oil} R_0}{\pi} \cosh^{-1}\left(\frac{x}{d}\right) \quad (7)$$

where R is the resistance value obtained from each of the equations (5), (6), and (7), and L, x, and d are the length, rod spacing, and rod diameters of the probe, as in equations (1) through (3).

The results obtained by the above three equations (5), (6), and (7) may be added to obtain a total resistance value by means of the following equation:

$$R_{total} = \frac{1}{R_{air}} + \frac{1}{R_{water}} + \frac{1}{R_{oil}}. \quad (8)$$

Figure 7:
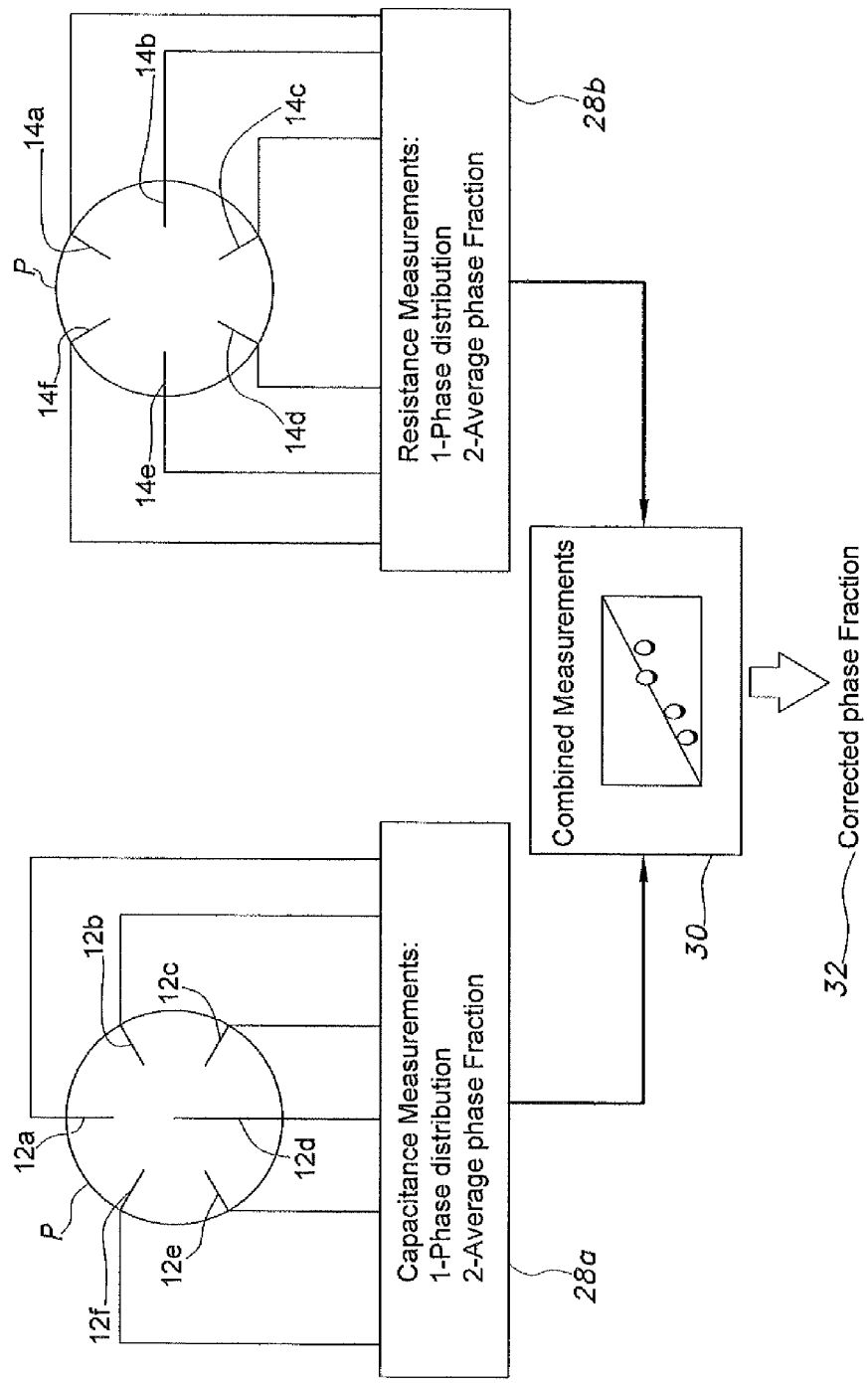
FIG. 7 is a flowchart illustrating the combination of the capacitance and resistance measurements from a single ring of probes of a multiphase flow detector according to the present invention.

FIG. 7 is a flowchart illustrating the basic steps in determining the fractional values of the fluids flowing through the pipe P using the above-described multiphase flow detector. The single ring of alternating capacitance and resistance probes is shown diagrammatically in FIG. 7, the capacitance probes 12a through 12f being shown in the cross-sectional representation of the pipe P to the left side and the resistance probes 14a through 14f being shown in the cross-sectional representation of the pipe P to the right side of FIG. 7. It will be understood that the six capacitance probes 12a through 12f and the six resistance probes 14a through 14f would actually be installed in a single plane through the pipe P, as shown in FIGS. 2A and 2B.

The capacitance measurements comprise both phase distribution (over time as the fluids flow through the pipe P) and the average fraction of each of the oil, water, and gas phases as they flow through the pipe, as indicated by the left hand block 28 in FIG. 7. The resistance measurements are being made simultaneously by the resistance probes 14a through 14f of the right side of FIG. 7, as noted by the right hand block 28b in FIG. 7. The capacitance and resistance measurements described in the blocks 28a and 28b of FIG. 7 are combined in the next step 30 to arrive at a corrected phase fraction 32 that includes each of the various phase fractions of oil, water, and gas flowing through the pipeline P at the single location of the probes. The fraction of each phase in the fluid flow may be calculated to obtain instantaneous values, or may be averaged over any desired period of time.

Figure 8:
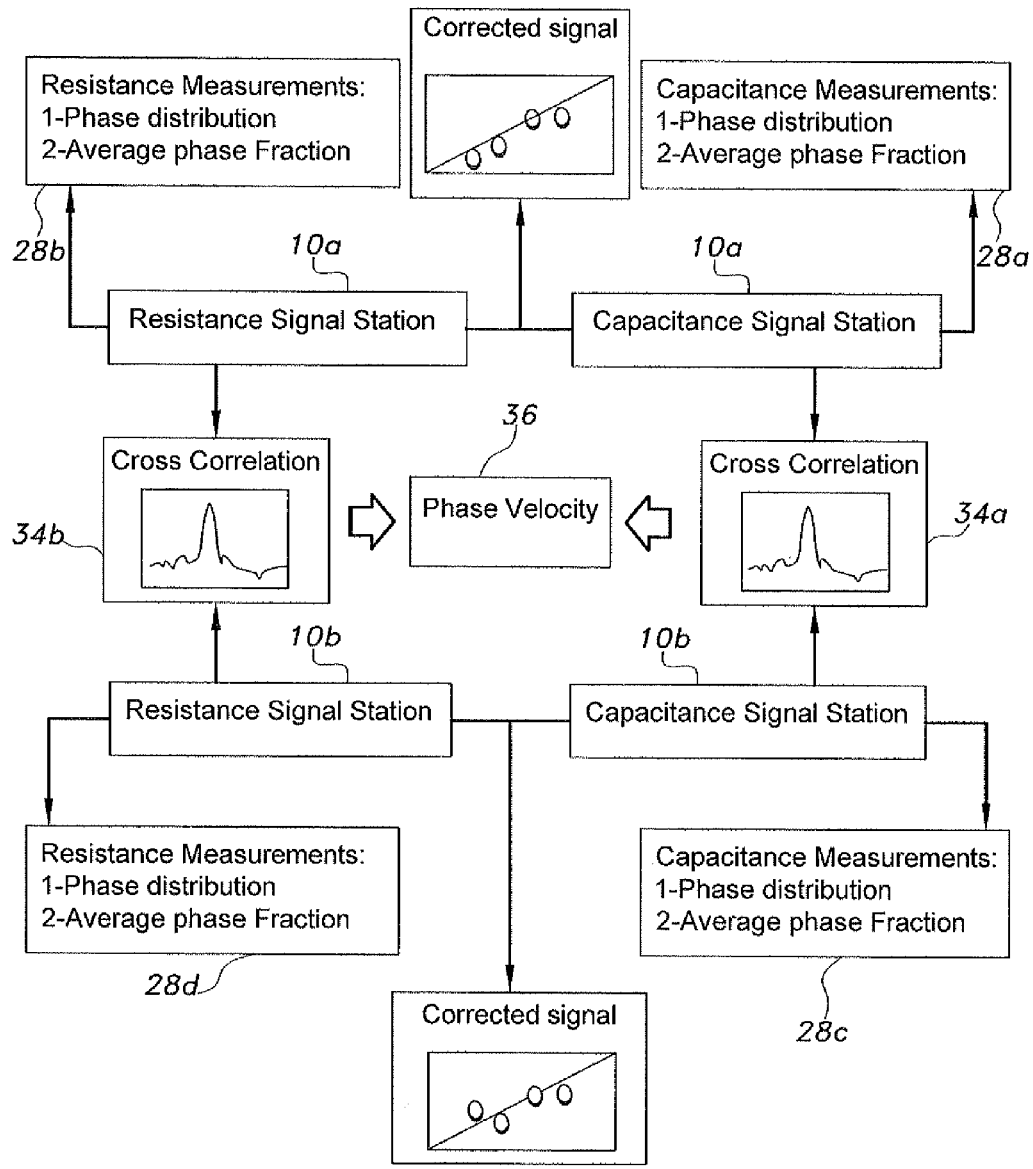
FIG. 8 is a flowchart illustrating the combination of the capacitance and resistance measurements from two spaced apart rings of probes of a multiphase flow detector according to the present invention.

To this point, only the phase characteristics of a fluid flowing through a single diametric plane of the pipe P have been considered. However, when two installations of capacitive and resistive probes are installed in a pipe P and separated by a known length of pipe L as shown in FIG. 1, the similar characteristics of the fluids passing through each of the arrays 10a and 10b and the times of their passing may be used to derive the velocity of the flow through the pipe P. The system for accomplishing this is shown in the flowchart of FIG. 8. Initially, the resistance probes 14 and capacitance probes 12 provide signals from their leading or upstream arrays 10a (as indicated in the upper portion of FIG. 8), transmitting those signals to the resistance and capacitance measurement blocks 28b and 28a. These blocks correspond to the identically referenced blocks in FIG. 7. In addition, the resistance and capacitance probes of the downstream array 10b (indicated in the lower portion of FIG. 8) transmit their signals to corresponding measurement blocks 28c and 28d, as indicated in the lower portion of FIG. 8. The resistance and capacitance signals from the upstream and downstream arrays 10a and 10b are also cross correlated with one another, as indicated by the resistance cross correlation block 34b (to the left center) and capacitance cross correlation block 34 (to the right center) in FIG. 8.

It will be seen that these two cross correlation blocks 34a and 34b receive substantially the same total signal, but those signals will be out of phase with one another due to the distance L between the first or upstream array 10a and the second or downstream array 10b, as shown in FIG. 1 of the drawings. By determining the time difference between the passage of substantially identical characteristics of the fluid flow over the known distance L in the pipe P, the velocity of the fluid flow may be determined, as indicated by the phase velocity block 36 in FIG. 8. It will be seen that this velocity determination is not only valid for the entire fluid flow, but may be broken down to determine the velocity of any given phase of fluid as well, as there may be some slight differences in velocity between the oil, water, and gas phases.

The multiphase flow detector provides continuous operation of the two types of probes, i.e., capacitance and resistance. This results in the elimination of the need for high frequency modulation of the output of the probes, as there is no need to switch between capacitance and resistance circuits in the processing of the data. Accordingly, the cost involved in constructing the detector system is significantly reduced, and the potential for error in constructing, setting up, and programming the system is also reduced. Yet, all of the standard characteristics of fluid flow in a pipe or the like may be detected by means of the present multiphase flow detector, without the need to resort to additional mechanical or electronic devices.

It is to be understood that the present invention is not limited to the embodiments described above, but encompasses any and all embodiments within the scope of the following claims.

We claim:

1. A multiphase flow detector for the detection of phase fractions of a fluid flowing in a pipe, the pipe having a length and a radius, the multiphase flow detector comprising:
    at least one plurality of capacitive probes adapted for extending radially into the pipe in a circumferential array;
    at least one plurality of resistive probes adapted for extending radially into the pipe in a circumferential array, the capacitive probes and the resistive probes being disposed in an alternating order in the same circumferential array with one another; and
    a central controller receiving capacitance and resistance measurement signals generated by each of the capacitive and resistive probes in response to the fluid flowing through the pipe, the controller having means for determining the fraction of each phase in the fluid flow.

2. The multiphase flow detector according to claim 1, wherein:
    at least some of the capacitive probes have different lengths from one another, ranging from a fraction of the radius of the pipe to one pipe radius; and
    at least some of the resistive probes have different lengths from one another ranging from a fraction of the radius of the pipe to one pipe radius.

3. The multiphase flow detector according to claim 2, wherein the probes have lengths ranging from four-tenths of the pipe radius to one pipe radius.

4. The multiphase flow detector according to claim 1, further comprising an annular detector band, each of the probes being installed in the band to form a single array of the alternating capacitive and resistance probes extending radially inward from the band, the band being adapted for insertion between two sections of a pipeline.

5. The multiphase flow detector according to claim 1, wherein each of the probes comprises two mutually spaced apart rods, the rods being parallel to one another.

6. The multiphase flow detector according to claim 1, wherein:
    the plurality of capacitive probes comprises six probes; and
    the plurality of resistive probes comprises six probes, the probes being separated from each other by about 30° when installed in the pipe.

7. The multiphase flow detector according to claim 1, wherein the probes are evenly distributed about the pipe circumference.

8. A multiphase flow detector for the detection of phase fractions of a fluid flowing in a pipe, the pipe having a length and a radius, the multiphase flow detector comprising:
    at least one plurality of capacitive probes, each of the probes having a base and a pair of parallel elongate sensor rods extending from the base, the capacitive probes being configured as an array having the bases forming a circle and the sensor rods extending radially inward, the sensor rods being adapted for extending radially inward into the fluid flow in the pipe;
    at least one plurality of resistive probes, each of the probes having a base and a pair of parallel elongate sensor rods extending from the base, the resistive probes being configured as an array having the bases forming a circle and the sensor rods extending radially inward, the sensor rods being adapted for extending radially inward into the fluid flow in the pipe, the array of resistive probes being overlaid on and interleaved with the array of capacitive probes to form a ring of alternating capacitive and resistive probes extending into the flow of fluid in the pipe; and
    a central controller receiving capacitance and resistance measurement signals generated by each of the capacitive and resistive probes in response to the fluid flowing through the pipe, the controller having means for determining the fraction of each phase in the fluid flow.

9. The multiphase flow detector according to claim 8, further comprising a rigid annular band, the array of capacitive probes and the array of resistive probes being mounted on the band, the band being adapted for connection between two sections of the pipe.

10. The multiphase flow detector according to claim 8, wherein:
    said at least one plurality of capacitive probes and said at least one plurality of resistive probes each consist of two pluralities of capacitive and resistive probes, the probes being configured into two rings of alternating capacitive and resistive probes extending into the flow of fluid in the pipe, the two rings being spaced apart by a known distance; and
    said central controller further comprises means for correlating a section of fluid flowing successively by the two rings and means for determining the velocity of fluid flow through the pipe.

11. The multiphase flow detector according to claim 10, further comprising a segment of pipe, the two rings of alternating capacitive and resistive probes being mounted in the segment of pipe with the sensor rods extending radially inward, the two rings being separated by the known distance, the segment of pipe being adapted for insertion between two sections of an existing pipeline.

12. The multiphase flow detector according to claim 8, wherein at least two of the capacitive probes and at least two of the resistive probes in each of the rings have different lengths, the lengths ranging from four-tenths of the pipe radius to one pipe radius.

13. The multiphase flow detector according to claim 8, wherein:
    the at least one plurality of capacitive probes consists of six probes; and
    the at least one plurality of resistive probes consists of six probes, the probes being separated from each other by about 30° when installed in the pipe.

14. The multiphase flow detector according to claim 8, wherein the probes are evenly distributed about the pipe circumference.

* * * * *